United States Patent [19]

Tokumaru et al.

[11] 4,382,662
[45] May 10, 1983

[54] INVERTED TELEPHOTO TYPE WIDE ANGLE LENS SYSTEM

[75] Inventors: Hisashi Tokumaru, Osaka; Akiyoshi Nakamura, Sakai, both of Japan

[73] Assignee: Minolta Camera Co., Ltd., Sakai, Japan

[21] Appl. No.: 151,445

[22] Filed: May 19, 1980

[30] Foreign Application Priority Data

Jun. 8, 1979 [JP] Japan .................. 54-72904
Jun. 11, 1979 [JP] Japan .................. 54-73779

[51] Int. Cl.$^3$ .......................... G02B 9/64; G02B 13/04
[52] U.S. Cl. ..................................... 350/458; 350/463
[58] Field of Search ............... 350/458, 463, 459-462

[56] References Cited

U.S. PATENT DOCUMENTS

| | | | |
|---|---|---|---|
| 3,369,853 | 2/1968 | Tolle | 350/460 |
| 3,877,795 | 4/1975 | Yamashita | 350/458 |
| 4,025,168 | 5/1977 | Sugiyama | 350/196 |
| 4,206,973 | 6/1980 | Ikemori | 350/463 |
| 4,217,034 | 8/1980 | Sugiyama | 350/463 |

FOREIGN PATENT DOCUMENTS 49-12822 2/1974 Japan.

*Primary Examiner*—John K. Corbin
*Assistant Examiner*—Rebecca D. Gass
*Attorney, Agent, or Firm*—Jackson, Jones & Price

[57] ABSTRACT

An inverted telephoto type wide angle lens system of an aperture ratio, 1/2.0 and a field angle, 84 degrees is provided. The lens system consists, from the object to the image side, of: a first component of a positive meniscus lens element convex to the object side; a second component of a negative meniscus lens element convex to the object side; a third component of a negative meniscus lens element convex to the object side; a fourth component of a biconvex lens element; an aperture stop; a fifth component of a positive meniscus lens element convex to the object side; a sixth component of a biconvex lens element; a seventh component of a biconcave lens element; an eighth component of a positive meniscus lens element convex to the image side; and a ninth component of overall positive refractive power including at least one lens element. The sixth component can be axially moved relative to the other components in association with the focusing for correcting the aberrations which would occur upon close focusing.

25 Claims, 37 Drawing Figures

Spherical Aberration   Astigmatism   Distortion

Spherical Aberration

Astigmatism

Distortion

Spherical Aberration   Astigmatism   Distortion

Spherical Aberration  Astigmatism  Distortion

FIG.9
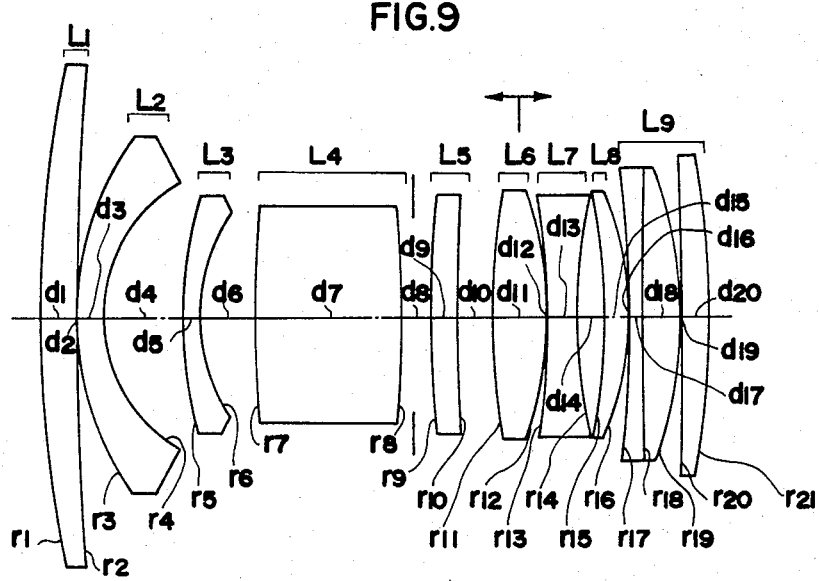
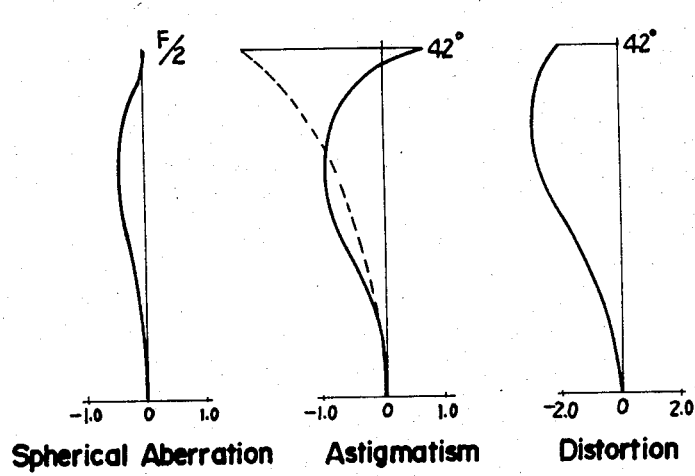
FIG.10a  FIG.10b  FIG.10c
Spherical Aberration  Astigmatism  Distortion
FIG.10d
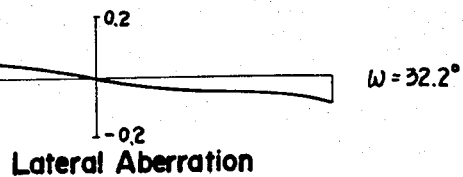
Lateral Aberration FIG.11a  FIG.11b  FIG.11c
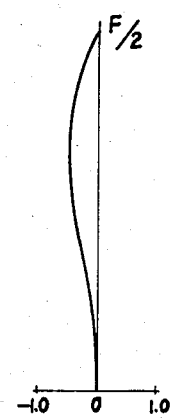
Spherical Aberration
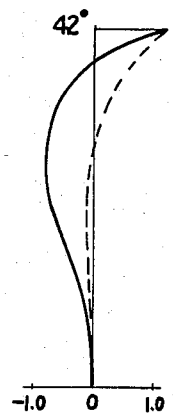
Astigmatism
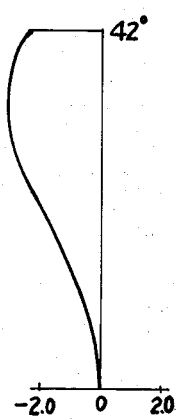
Distortion
FIG.11d
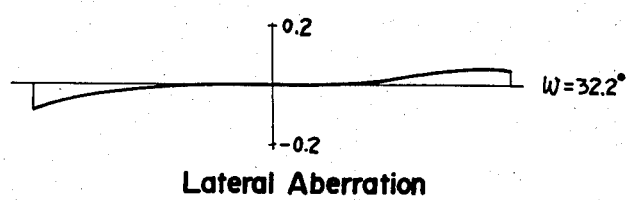
Lateral Aberration Spherical Aberration Astigmatism Distortion Lateral Aberration Spherical Aberration Astigmatism Distortion Lateral Aberration Spherical Aberration Astigmatism Distortion Lateral Aberration

INVERTED TELEPHOTO TYPE WIDE ANGLE LENS SYSTEM

BACKGROUND OF THE INVENTION

1. Field of the Invention

The present invention generally relates to an inverted telephoto type wide angle lens system for use in a camera, such as a 35 mm single lens reflex camera, and more particularly to a wide angle lens system with a back focal distance greater than the focal length of the system.

2. Description of the Prior Art

In this field of art, various lens systems have been suggested in the prior art such as that disclosed in the U.S. Pat. No. 4,025,168 and Japanese Patent Application laid open to the public No. 49-12822. As disclosed in the Japanese Patent Application, it is known in this field of art to correct aberrations by means of axially shifting a portion of a lens system relative to the other portion of the lens system in association with the focusing to the closer object.

There is still a demand in the prior art to provide an inverted telephoto type wide angle lens system which is great in the aperture ratio, wide in the field angle, compact in size, short in the minimum object distance, and high in quality.

SUMMARY OF THE INVENTION

An object of the present invention is to improve an inverted telephoto type wide angle lens system.

Another object of the present invention is to provide an inverted telephoto type wide angle lens system with a great aperture ratio such as greater than 1/2.0 and a wide field angle such as 84 degrees.

Still another object of the present invention is to provide an inverted telephoto type wide angle lens system which is compact in size.

A further object of the present invention is to provide an inverted telephoto type wide angle lens system which is capable of focusing on a close object with the aberration correction of the lens system successfully maintained.

The inverted telephoto type wide angle lens system of the present invention comprises an aperture stop, a first group of lens elements defined between a front surface of the system and a surface adjacent to the aperture stop at the object side thereof and a second group of lens elements defined between a surface adjacent to the aperture stop at the image side thereof and a rear surface of the system. According to a feature of the present invention, the second group includes next to the aperture stop a positive meniscus lens element convex to the object side. According to another feature of the present invention, the second group includes a biconvex lens element, at least one lens element located between the aperture stop and the biconvex lens element, and at least one lens element located at the image side of the biconvex lens element. The biconvex lens element is axially movable relative to the other lens elements in association with the focusing. And, according to still another feature of the present invention, the lens system fulfills the following conditions:

$1.5f < |f_F| < 3.0f, f_F < 0$ $3f < f_m < 12f$ $f < r_m < 5f$ $0.06f < d < 0.2f$ $0.15f < X < 0.4f$ $0.6f < f_b < 2.0f$

The features of the present invention which are believed to be novel are set forth with particularity in the appended claims. The present invention, both as to its organization and manner of operation, together with further objects and advantages thereof, may best be understood by reference to the following description, taken in conjunction with the accompanying drawings.

BRIEF DESCRIPTION OF THE DRAWINGS

FIG. 9 is schematical cross-sectional view of the fifth embodiment of the present invention;

FIGS. 10a, 10b, 10c and 10d; FIGS. 11a, 11b, 11c, 11d.

DETAILED DESCRIPTION OF THE PREFERRED EMBODIMENTS

Figure 1:
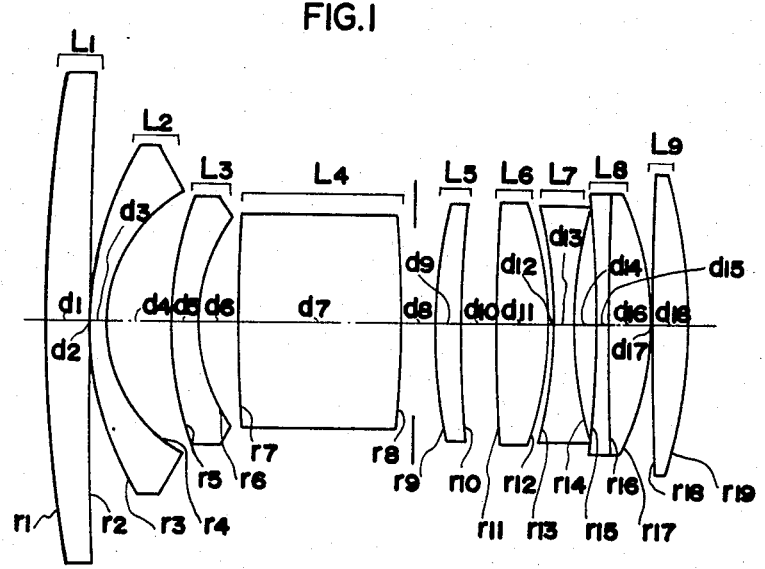
FIG. 1 is a schematic cross-sectional view of a first embodiment of the present invention.

The following description is provided to enable any person skilled in the optical art to make and use the invention and sets forth the best modes contemplated by the invention for carrying out their invention. Various modifications, however, will remain readily apparent to those skilled in the art, since the generic principles of the present invention have been defined herein specifically to provide an inverted telephoto type wide angle lens system.

In the accompanying drawings which supplement the following tables, the lenses in accordance with the present invention are illustrated diagrammatically. As usual, in conventional lens diagrams, light is assumed to travel from left to right. The individual lens groups are designated by the letter L with a subscript number corresponding to the consecutive numbers of the lens groups from the object to image side. The radii of curvature of the lenses are indicated by r, with a subscript corresponding to consecutive numbers of the lens elements. The axial distances, d, along the optical axis are set forth both in the tables and in the drawings and include both the axial spacings between the lens elements and the thickness of the lens elements. Finally, the refractive index, N, and Abbe number, $\nu$, are provided in each of the tables. Since the specific lens parameters are provided herein to meet the requirements of a full disclosure adequate to convey the present invention to a lens designer, they should not be construed as limiting to any specific lens design as set forth in an individual embodiment.

Figure 3:
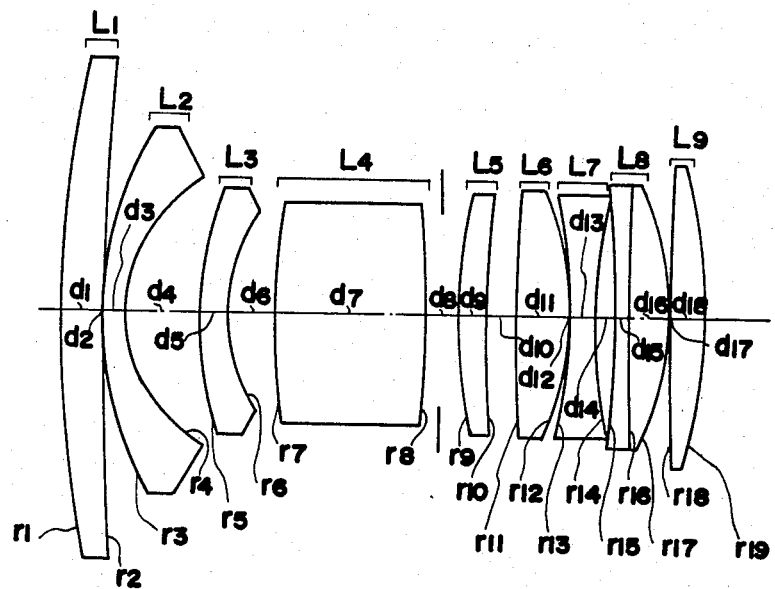
FIG. 3 is a schematic cross-sectional view of a second embodiment of the present invention.
Figure 4A:
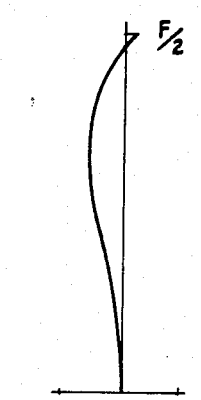
FIGS. 4a, 4b and 4c are graphical plots of the aberrations of the second embodiment.
Figure 4B:
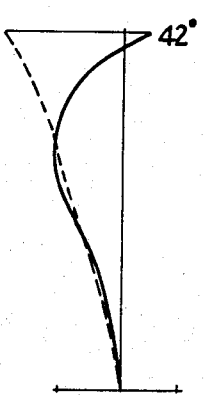
Figure 4C:
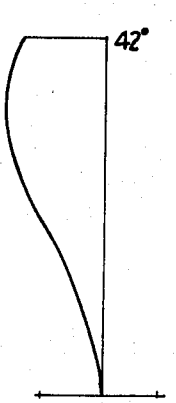
Figure 5:
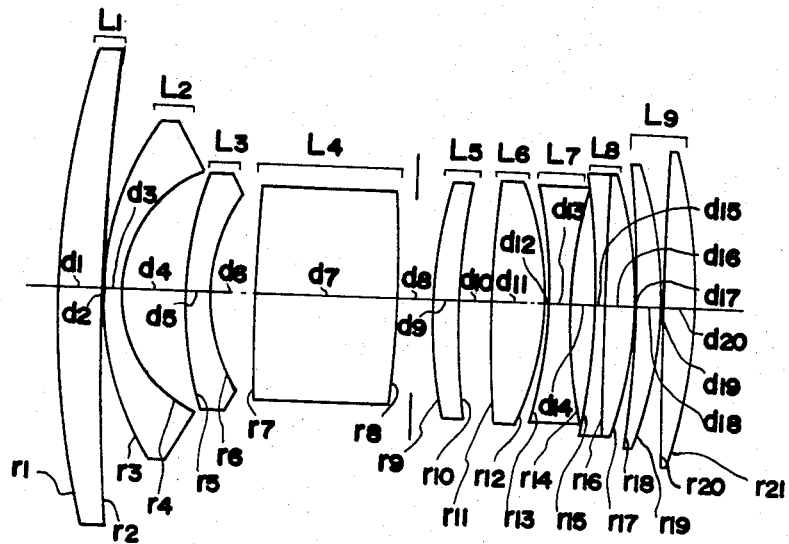
FIG. 5 is a schematic cross-sectional view of a third embodiment of the present invention.
Figures 6A, 6B, 6C:
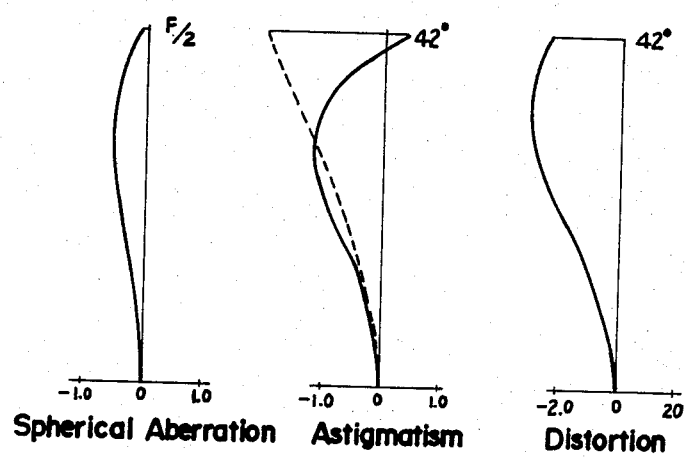
FIGS. 6a, 6b and 6c are graphical plots of the aberrations of the third embodiment.
Figure 7:
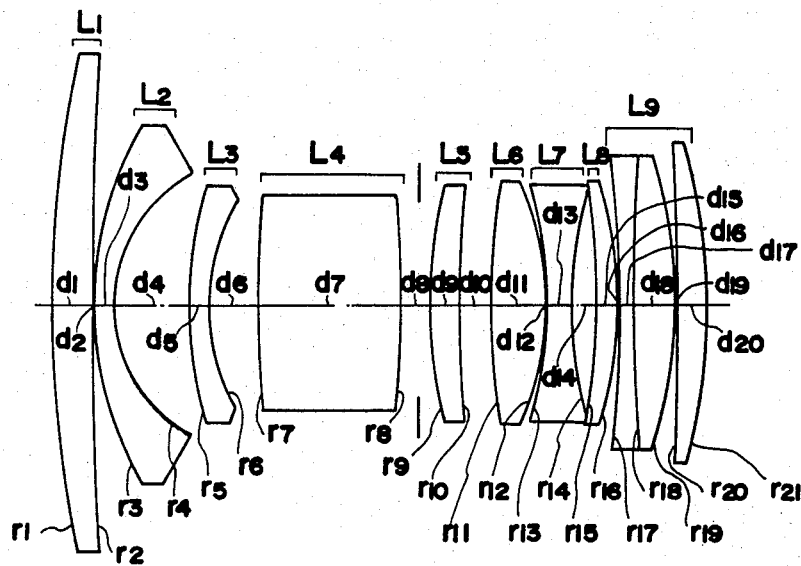
FIG. 7 is a schematical cross-sectional view of the fourth embodiment of the present invention.
Figures 8A, 8B, 8C:
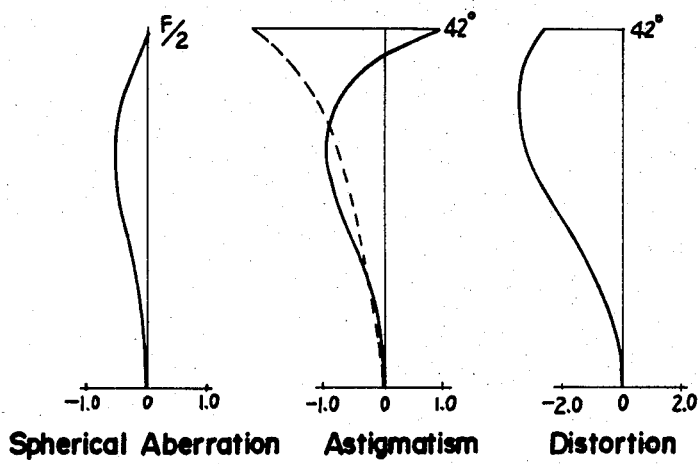
FIGS. 8a, 8b and 8c are graphical plots of the aberrations of the fourth embodiment.

As can be seen in each of the embodiments of the present invention disclosed in FIGS. 1, 3, 5, 7 and 9, an inverted telephoto type wide angle lens system comprises an aperture stop, a first group of lens elements ($L_1$ to $L_4$) defined between a front surface ($r_1$) of the system and a surface ($r_8$) adjacent to the aperture stop at the object side thereof, and a second group of lens elements ($L_5$ to $L_9$) defined between a surface ($r_9$) adjacent to the aperture stop at the image side thereof and a rear surface ($r_{19}$ in case of FIGS. 1 and 3; $r_{21}$ in case of FIGS. 5, 7 and 9) of the system.

According to the present invention, the second group includes next to the aperture stop a positive meniscus lens element ($L_5$) convex to the object side and the lens system fulfills the following conditions:

$$1.5f < |f_F| < 3.0f, f_F < 0 \quad (1)$$

$$3f < f_m < 12f \quad (2)$$

$$f < r_m < 5f \quad (3)$$

$$0.06f < d < 0.2f \quad (4)$$

wherein:

$f_F$ represents an overall focal length of the first group ($L_1$ to $L_4$);

$f_m$ represents a focal length of the positive meniscus lens element ($L_5$);

$r_m$ represents a radius of curvature of an object side surface ($r_9$) of the positive meniscus lens element ($L_5$);

d represents an axial width ($d_{10}$) of an air space next to the positive meniscus lens element ($L_5$) at the image side thereof; and f represents a focal length of the whole lens system.

As is well known, an inverted telephoto type wide angle lens system has an asymmetric power distribution, i.e., a negative power mainly on the object side and a positive power mainly on the image side. This asymmetric power distribution is generally known to cause a gradual deterioration of the aberration correction, which correction is achieved with respect to an object in infinity, in accordance with the decrease of the object distance. Thus, if it is desired to decrease the minimum object distance in which focusing is possible with a tolerable aberration correction maintained, the above mentioned deterioration of the aberration correction has to be overcome. According to the present invention, this can be accomplished by a feature, which is summarized as follows.

Namely, the second group of the present invention includes a biconvex lens element ($L_6$), at least one lens element ($L_5$) located between the aperture stop and the biconvex lens element ($L_6$), and at least one lens element ($L_7$ to $L_9$) located at the image side of the biconvex lens element ($L_6$), wherein the biconvex lens element ($L_6$) is axially movable relative to the other lens elements ($L_1$ to $L_5$ and $L_7$ to $L_9$) in association with the focusing, and the lens system fulfills the following conditions:

$$0.15f < X < 0.4f \quad (5)$$

$$0.6f < f_b < 2.0f \quad (6)$$

wherein:

X represents the maximum axial distance from the aperture stop to the object side surface of the biconvex lens element;

$f_b$ represents the focal length of the biconvex lens element, and f represents a focal length of the whole lens system.

A more detailed lens construction is apparent from FIGS. 1, 3, 5, 7 and 9, which construction consists, from the object to the image side, of: a first component ($L_1$) of a positive meniscus lens element convex to the object side; a second group ($L_2$) of a negative meniscus lens element convex to the object side; a third component ($L_3$) of a negative meniscus lens element convex to the object side; a fourth group component ($L_4$) of a biconvex lens element; an aperture stop; a fifth component ($L_5$) of a positive meniscus lens element convex to the object side; a sixth component ($L_6$) of a biconvex lens element; a seventh component ($L_7$) of a biconcave lens element; a eighth component ($L_8$) of a positive meniscus lens element convex to the image side; and a ninth component ($L_9$) of overall positive refractive power including at least one lens element.

The positive meniscus lens element next to the aperture stop at the image side thereof corresponds to the above fifth component ($L_5$) of the embodiments in FIGS. 1, 3, 5, 7 and 9. In the embodiment of FIG. 9, the sixth component ($L_6$) is exemplarily disclosed to be axially moved relative to the other components ($L_1$ to $L_5$ and $L_7$ to $L_9$) for corresponding to the biconvex lens element which is axially moved in association with the focusing. In case of the embodiments in FIGS. 1, 3 and 5, the eighth component is a doublet, and the ninth component of the embodiments of FIGS. 5, 7 and 9 each have a pair of lens elements, one of which is a doublet in case of the embodiments of FIGS. 7 and 9.

The description hereinafter will be directed to explanations for the above mentioned conditions (1) to (6). Condition (1) defines an overall focal length of the first group ($L_1$ to $L_4$) of an overall negative refractive power. If the lower limit is violated, the strengthened negative refractive power increases negative distortion and astigmatism, which are incapable of being corrected by means of the second group ($L_5$ to $L_9$). On the contrary, a sufficiently long back focal distance cannot be obtained if the upper limit is violated to excessively decrease the diverging power of the first group.

Conditions (2) and (3) respectively define the refractive power and the shape of the lens element ($L_5$) next to the aperture stop at the image side thereof. This lens element ($L_5$) is effective to correct spherical aberration and coma which would be generated if a lens system of a greater aperture ratio is desired. If the lower limit of condition (2) is violated, spherical aberration and field curvature are negatively deviated, which is unfavorable to the increase of the aperture ratio. On the contrary, if the upper limit of condition (2) is violated, coma and astigmatism cannot be corrected unless the size of the whole lens system is undesirably increased. With respect to condition (3), an under correction of spherical aberration would be caused by an excessively strong refractive power of the surface ($r_9$) facing the aperture stop if the lower limit is violated, while it would be difficult to correct coma and field curvature in case of a violation of the upper limit.

Condition (4) defines the axial length of an air space ($d_{10}$) next to the lens element ($L_5$) at the image side thereof. A violation of the lower limit of condition (49 means an excessively narrow air space next to the lens element ($L_5$). Such a narrow air space is apt to result in an unbalance between corrections of spherical aberration and astigmatism, which is unfavorable to a uniform image surface within the field angle. An excessively wide air space ($d_{10}$) violating the upper limit, however, would be unfavorable to sufficient back focal distance, to the correction of the lateral chromatic aberration, and to the sufficient illumination for the marginal area of the film, which are not compensated by means of any effect of the other lens elements.

Conditions (5) and (6) relate to aberration correction upon close focusing. As already discussed, aberration correction of an inverted telephoto type wide angle lens system, which is achieved with respect to an object at infinity, is gradually deteriorated in accordance with a gradual decrease of the object distance. The deterioration is characterized by a typical increase in the negative deviation of the spherical aberration, in the positive deviation of the astigmatism, and in the distortion, respectively. In the prior art, an air space in which the aperture stop is located and the light rays of a light pencil travel in parallel with each other is changed to recover the deterioration of aberration correction. The change in air space causes some positive deviation of spherical aberration and a great negative deviation of astigmatism and is favorable to a recovery of the above mentioned deterioration with respect to the spherical aberration and astigmatism. The change in this air space, however, has little effect on the correction of distortion. Further, the correction of coma is also insufficient. The insufficiency of correcting distortion and coma in the prior art technique is more remarkable if the minimum object distance is desired to be shorter in a compact system of a great aperture ratio. In addition, the overall diverging refractive power of the lens groups located at the object side of the aperture stop is recently desired to be stronger. Under such a condition, the prior art technique of changing the air space in which the aperture stop is located results in an over correction of spherical aberration if the astigmatism is desired to be sufficiently corrected, which in turn causes a flare over the whole area within the field angle. Thus, the prior art technique does not fulfill the recent demand of shortening the minimum object distance of a compact wide angle lens system of great aperture ratio with a tolerable aberration correction maintained. A novel technique has long been sought to accomplish their purpose. The conditions (5) and (6) relate to such a novel technique.

According to a feature of the present invention, a biconvex lens element ($L_6$) is located at the image side of the aperture stop with at least one lens element ($L_5$) sandwiched in between the aperture stop and the biconvex lens element ($L_6$) in the manner of fulfilling the conditions (5) and (6). The biconvex lens element ($L_6$) is axially moved relative to the other lens elements to change a pair of air spaces ($d_{10}$ and $d_{12}$) on both sides of the biconvex lens element ($L_6$) in association with the focusing. With respect to the correction of astigmatism, the change in the air space ($d_{10}$) between at least one lens element ($L_5$) and the biconvex lens element ($L_6$) is mainly utilized, while a combination of changes in both the air spaces ($d_{10}$ and $d_{12}$) is utilized for correcting spherical aberration, coma and distortion, and thus the corrections for spherical aberration and astigmatism are balanced and the effective corrections for distortion and coma are successively achieved.

Condition (5) defines the maximum distance from the position of the aperture stop to the axially movable biconvex lens element ($L_6$), the position of the aperture stop being defined as a position at which the principal ray of an off-axial light pencil intersects the optical axis. If the lower limit of condition (5) is violated, the correction of coma is insufficient since the position of the movable lens element is too close to the aperture stop in this case and is almost identical with the prior art technique wherein the air space for locating the aperture stop is changed. On the other hand, if the upper limit is violated, the balance between the corrections of spherical aberration and astigmatism would be disturbed with respect to close focusing, and any attempt to recover it would result in a deterioration of aberration correction with respect to focusing at infinity.

Condition (6) relates to the focal length of the axially movable biconvex lens element ($L_6$). If the lower limit is violated to excessively increase the refractive power of the movable lens element ($L_6$), the tolerance for eccentricity of the movable lens element ($L_6$) would be too limited to realize a practical lens barrel mechanism for the lens movement although the lens movement path necessary for sufficient aberration correction can be favorably reduced. Further, the balance between corrections of coma and distortion would be lost in this case, and the attempt to move a lens element would not make sense. On the other hand, although the tolerance for eccentricity of the movable lens element ($L_6$) may be increased, the whole lens system would inevitably be bulky. Thus, the violation of the upper limit of condition (6) contradicts an object of the present invention, that is to make the system compact in size.

Figures 2A, 2B, 2C:
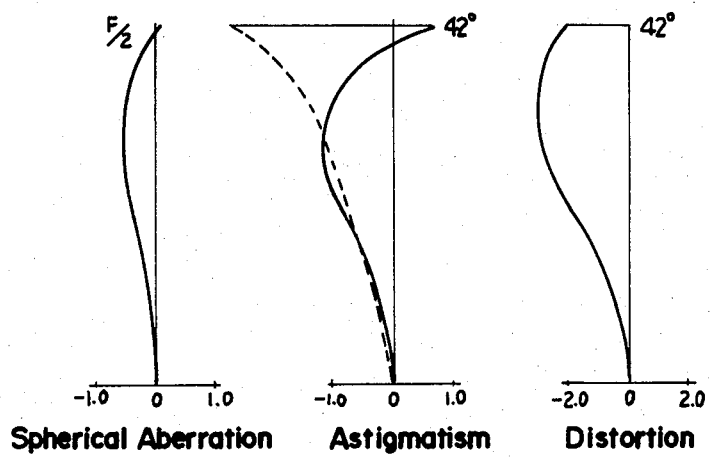
FIGS. 2a, 2b and 2c are respectively graphical plots of the aberrations of the first embodiment.

Tables 1 to 5 show the first to fifth embodiments of the present invention, respectively. FIGS. 1, 3, 5, 7 and 9 correspond to the first to fifth embodiments, respectively. The graphic plots of aberrations of the first to fifth embodiments in an infinity focusing condition are shown in FIGS. 2(2a, 2b and 2c), 4(4a, 4b and 4c), 6(6a, 6b and 6c), 8(8a, 8b and 8c) and 10(10a, 10b, 10c, and 10d), respectively.

TABLE 1

[Embodiment 1]
$f = 100$  $F_{NO} = 2.0$  $2\omega = 84°$

| Radius of Curvature | Axial Distance | Refractive Index | Abbe Number |
|---|---|---|---|
| $r_1 = 463.80$ | | | |
| | $d_1 = 14.80$ | $N_1 = 1.6935$ | $\nu_1 = 53.4$ |
| $r_2 = 3128.72$ | | | |
| | $d_2 = 0.40$ | | |
| $r_3 = 116.14$ | | | |
| | $d_3 = 6.10$ | $N_2 = 1.5168$ | $\nu_2 = 64.1$ |
| $r_4 = 49.77$ | | | |
| | $d_4 = 20.78$ | | |
| $r_5 = 132.28$ | | | |
| | $d_5 = 9.20$ | $N_3 = 1.4875$ | $\nu_3 = 70.1$ |
| $r_6 = 58.18$ | | | |
| | $d_6 = 13.21$ | | |
| $r_7 = 469.04$ | | | |
| | $d_7 = 55.47$ | $N_4 = 1.8075$ | $\nu_4 = 35.5$ |
| $r_8 = -487.54$ | | | |
| | $d_8 = 10.98$ | | |
| $r_9 = 175.69$ | | | |
| | $d_9 = 8.82$ | $N_5 = 1.8052$ | $\nu_5 = 25.4$ |
| $r_{10} = 329.40$ | | | |
| | $d_{10} = 12.34$ | | |
| $r_{11} = 568.16$ | | | |
| | $d_{11} = 18.34$ | $N_6 = 1.7725$ | $\nu_6 = 49.8$ |
| $r_{12} = -114.45$ | | | |
| | $d_{12} = 1.13$ | | |

TABLE 1-continued

[Embodiment 1]
$f = 100 \quad F_{NO} = 2.0 \quad 2\omega = 84°$

| Radius of Curvature | Axial Distance | Refractive Index | Abbe Number |
|---|---|---|---|
| $r_{13} = -195.35$ | | | |
| | $d_{13} = 6.72$ | $N_7 = 1.8052$ | $\nu_7 = 25.4$ |
| $r_{14} = 135.98$ | | | |
| | $d_{14} = 7.95$ | | |
| $r_{15} = -516.94$ | | | |
| | $d_{15} = 4.51$ | $N_8 = 1.8052$ | $\nu_8 = 25.4$ |
| $r_{16} = 2684.77$ | | | |
| | $d_{16} = 13.61$ | $N_9 = 1.7725$ | $\nu_9 = 49.8$ |
| $r_{17} = -120.56$ | | | |
| | $d_{17} = 0.40$ | | |
| $r_{18} = 1145.38$ | | | |
| | $d_{18} = 13.50$ | $N_{10} = 1.6968$ | $\nu_{10} = 55.5$ |
| $r_{19} = -178.15$ | | | |

TABLE 2

[Embodiment 2]
$f = 100 \quad F_{NO} = 2.0 \quad 2\omega = 84°$

| Radius of Curvature | Axial Distance | Refractive Index | Abbe Number |
|---|---|---|---|
| $r_1 = 412.30$ | | | |
| | $d_1 = 14.80$ | $N_1 = 1.6935$ | $\nu_1 = 53.4$ |
| $r_2 = 1754.24$ | | | |
| | $d_2 = 0.40$ | | |
| $r_3 = 124.08$ | | | |
| | $d_3 = 7.00$ | $N_2 = 1.5168$ | $\nu_2 = 64.1$ |
| $r_4 = 50.79$ | | | |
| | $d_4 = 23.62$ | | |
| $r_5 = 116.17$ | | | |
| | $d_5 = 10.07$ | $N_3 = 1.5168$ | $\nu_3 = 64.1$ |
| $r_6 = 55.77$ | | | |
| | $d_6 = 16.40$ | | |
| $r_7 = 401.89$ | | | |
| | $d_7 = 50.30$ | $N_4 = 1.8075$ | $\nu_4 = 35.5$ |
| $r_8 = -486.70$ | | | |
| | $d_8 = 10.71$ | | |
| $r_9 = 194.98$ | | | |
| | $d_9 = 9.18$ | $N_5 = 1.8052$ | $\nu_5 = 25.4$ |
| $r_{10} = 343.60$ | | | |
| | $d_{10} = 10.15$ | | |
| $r_{11} = 539.68$ | | | |
| | $d_{11} = 18.20$ | $N_6 = 1.7883$ | $\nu_6 = 47.3$ |
| $r_{12} = -110.70$ | | | |
| | $d_{12} = 0.50$ | | |
| $r_{13} = -186.42$ | | | |
| | $d_{13} = 7.70$ | $N_7 = 1.8052$ | $\nu_7 = 25.4$ |
| $r_{14} = 137.97$ | | | |
| | $d_{14} = 7.34$ | | |
| $r_{15} = -427.68$ | | | |
| | $d_{15} = 4.31$ | $N_8 = 1.8052$ | $\nu_8 = 25.4$ |
| $r_{16} = 1516.58$ | | | |
| | $d_{16} = 13.51$ | $N_9 = 1.7725$ | $\nu_9 = 49.8$ |
| $r_{17} = -114.41$ | | | |
| | $d_{17} = 0.40$ | | |
| $r_{18} = 1139.17$ | | | |
| | $d_{18} = 12.5$ | $N_{10} = 1.6968$ | $\nu_{10} = 55.5$ |
| $r_{19} = -188.76$ | | | |

TABLE 3

[Embodiment 3]
$f = 100 \quad F_{NO} = 2.0 \quad 2\omega = 84°$

| Radius of Curvature | Axial Distance | Refractive Index | Abbe Number |
|---|---|---|---|
| $r_1 = 290.19$ | | | |
| | $d_1 = 14.80$ | $N_1 = 1.6935$ | $\nu_1 = 53.4$ |
| $r_2 = 841.69$ | | | |
| | $d_2 = 0.40$ | | |
| $r_3 = 100.56$ | | | |
| | $d_3 = 6.62$ | $N_2 = 1.5168$ | $\nu_2 = 64.1$ |
| $r_4 = 45.81$ | | | |
| | $d_4 = 21.28$ | | |
| $r_5 = 126.62$ | | | |
| | $d_5 = 8.70$ | $N_3 = 1.5407$ | $\nu_3 = 47.3$ |
| $r_6 = 60.06$ | | | |
| | $d_6 = 14.98$ | | |
| $r_7 = 991.75$ | | | |
| | $d_7 = 47.57$ | $N_4 = 1.8052$ | $\nu_4 = 25.4$ |
| $r_8 = -351.42$ | | | |
| | $d_8 = 10.72$ | | |
| $r_9 = 166.45$ | | | |
| | $d_9 = 9.00$ | $N_5 = 1.8052$ | $\nu_5 = 25.4$ |
| $r_{10} = 225.67$ | | | |
| | $d_{10} = 10.95$ | | |
| $r_{11} = 376.58$ | | | |
| | $d_{11} = 18.23$ | $N_6 = 1.7885$ | $\nu_6 = 45.7$ |
| $r_{12} = -110.00$ | | | |
| | $d_{12} = 0.99$ | | |
| $r_{13} = -165.82$ | | | |
| | $d_{13} = 7.38$ | $N_7 = 1.8052$ | $\nu_7 = 25.4$ |
| $r_{14} = 145.53$ | | | |
| | $d_{14} = 7.60$ | | |
| $r_{15} = -370.93$ | | | |
| | $d_{15} = 4.46$ | $N_8 = 1.8052$ | $\nu_8 = 25.4$ |
| $r_{16} = -2975.77$ | | | |
| | $d_{16} = 11.22$ | $N_9 = 1.6968$ | $\nu_9 = 55.5$ |
| $r_{17} = -128.75$ | | | |
| | $d_{17} = 0.40$ | | |
| $r_{18} = -272.25$ | | | |
| | $d_{18} = 8.0$ | $N_{10} = 1.6968$ | $\nu_{10} = 55.5$ |
| $r_{19} = -142.07$ | | | |
| | $d_{19} = 0.40$ | | |
| $r_{20} = 8405.48$ | | | |
| | $d_{20} = 11.5$ | $N_{11} = 1.6968$ | $\nu_{11} = 55.5$ |
| $r_{21} = -192.61$ | | | |

TABLE 4

[Embodiment 4]
$f = 100 \quad F_{NO} = 2.0 \quad 2\omega = 84°$

| Radius of Curvature | Axial Distance | Refractive Index | Abbe Number |
|---|---|---|---|
| $r_1 = 416.01$ | | | |
| | $d_1 = 14.0$ | $N_1 = 1.6935$ | $\nu_1 = 53.4$ |
| $r_2 = 1858.46$ | | | |
| | $d_2 = 0.40$ | | |
| $r_3 = 116.58$ | | | |
| | $d_3 = 6.80$ | $N_2 = 1.5182$ | $\nu_2 = 59.0$ |
| $r_4 = 50.46$ | | | |
| | $d_4 = 24.07$ | | |
| $r_5 = 111.94$ | | | |
| | $d_5 = 6.48$ | $N_3 = 1.5182$ | $\nu_3 = 59.0$ |
| $r_6 = 56.91$ | | | |
| | $d_6 = 18.08$ | | |
| $r_7 = 497.66$ | | | |
| | $d_7 = 47.54$ | $N_4 = 1.8052$ | $\nu_4 = 25.4$ |
| $r_8 = -909.71$ | | | |
| | $d_8 = 10.50$ | | |
| $r_9 = 189.68$ | | | |
| | $d_9 = 9.00$ | $N_5 = 1.8052$ | $\nu_5 = 25.4$ |
| $r_{10} = 300.52$ | | | |
| | $d_{10} = 10.00$ | | |
| $r_{11} = 230.50$ | | | |
| | $d_{11} = 18.5$ | $N_6 = 1.8070$ | $\nu_6 = 39.8$ |
| $r_{12} = -118.65$ | | | |
| | $d_{12} = 1.00$ | | |
| $r_{13} = -154.24$ | | | |
| | $d_{13} = 8.10$ | $N_7 = 1.8052$ | $\nu_7 = 25.4$ |
| $r_{14} = 132.20$ | | | |
| | $d_{14} = 8.84$ | | |
| $r_{15} = -254.24$ | | | |
| | $d_{15} = 8.20$ | $N_8 = 1.6968$ | $\nu_8 = 55.5$ |
| $r_{16} = -111.88$ | | | |
| | $d_{16} = 0.40$ | | |
| $r_{17} = -354.22$ | | | |
| | $d_{17} = 4.40$ | $N_9 = 1.8052$ | $\nu_9 = 25.4$ |
| $r_{18} = 1016.63$ | | | |
| | $d_{18} = 13.00$ | $N_{10} = 1.7725$ | $\nu_{10} = 49.8$ |
| $r_{19} = -150.77$ | | | |
| | $d_{19} = 0.40$ | | |

TABLE 4-continued

[Embodiment 4]
$f = 100$    $F_{NO} = 2.0$    $2\omega = 84°$

| Radius of Curvature | Axial Distance | Refractive Index | Abbe Number |
|---|---|---|---|
| $r_{20} = -2201.97$ | | | |
| | $d_{20} = 10.20$ | $N_{11} = 1.6968$ | $\nu_{11} = 55.5$ |
| $r_{21} = -203.79$ | | | |

TABLE 5

[Embodiment 5]
$f = 100$    $F_{NO} = 2.0$    $2\omega = 84°$    $\beta = 1/\infty X$

| Radius of Curvature | Axial Distance | Refractive Index | Abbe Number |
|---|---|---|---|
| $r_1 = 386.19$ | | | |
| | $d_1 = 13.01$ | $N_1 = 1.6935$ | $\nu_1 = 53.4$ |
| $r_2 = 1459.88$ | | | |
| | $d_2 = 0.40$ | | |
| $r_3 = 112.05$ | | | |
| | $d_3 = 7.91$ | $N_2 = 1.5182$ | $\nu_2 = 59.0$ |
| $r_4 = 51.65$ | | | |
| | $d_4 = 25.77$ | | |
| $r_5 = 119.59$ | | | |
| | $d_5 = 6.83$ | $N_3 = 1.5168$ | $\nu_3 = 64.1$ |
| $r_6 = 55.44$ | | | |
| | $d_6 = 18.44$ | | |
| $r_7 = 496.55$ | | | |
| | $d_7 = 48.70$ | $N_4 = 1.8052$ | $\nu_4 = 25.4$ |
| $r_8 = -673.50$ | | | |
| | $d_8 = 10.50$ | | |
| $r_9 = 380.44$ | | | |
| | $d_9 = 9.00$ | $N_5 = 1.8074$ | $\nu_5 = 31.6$ |
| $r_{10} = 784.82$ | | | |
| | $d_{10} = 11.46$ | (Variable) | |
| $r_{11} = 206.07$ | | | |
| | $d_{11} = 19.10$ | $N_6 = 1.7856$ | $\nu_6 = 42.8$ |
| $r_{12} = -124.13$ | | | |
| | $d_{12} = 1.0$ | (Variable) | |
| $r_{13} = -185.94$ | | | |
| | $d_{13} = 8.11$ | $N_7 = 1.8052$ | $\nu_7 = 25.4$ |
| $r_{14} = 130.51$ | | | |
| | $d_{14} = 9.92$ | | |
| $r_{15} = -224.87$ | | | |
| | $d_{15} = 8.60$ | $N_8 = 1.6968$ | $\nu_8 = 55.5$ |
| $r_{16} = -110.37$ | | | |
| | $d_{16} = 0.40$ | | |
| $r_{17} = -380.62$ | | | |
| | $d_{17} = 4.50$ | $N_9 = 1.8052$ | $\nu_9 = 25.4$ |
| $r_{18} = 3855.20$ | | | |
| | $d_{18} = 12.44$ | $N_{10} = 1.7725$ | $\nu_{10} = 49.8$ |
| $r_{19} = -148.84$ | | | |
| | $d_{19} = 0.40$ | | |
| $r_{20} = 2078.92$ | | | |
| | $d_{20} = 9.70$ | $N_{11} = 1.6968$ | $\nu_{11} = 55.5$ |
| $r_{21} = -300.36$ | | | |

$d_{10} + d_{12} = 12.46$ is maintained in any case.
In case of $\beta = 0.025X$, $d_{10} = 10.61$, $d_{11} = 1.85$.
In case of $\beta = 0.157X$, $d_{10} = 6.20$, $d_{11} = 6.26$.

As already mentioned, the fifth embodiment exemplary shows the axial movement of the biconvex lens element (L6). In case of the fifth embodiment, $X = 0.2596$ f and $f_M = 1.012$ f. This lens element (L6) is moved toward the object side in accordance with the focusing to a closer object, and the relatively wide air space $d_{10}$ is reduced from 11.46, which is a value for an infinity focusing condition, while the air space $d_{12}$ is correspondingly increased from 1.0. Thus, the relatively wide air space ($d_{10}$) is for allowing the movement of lens element (L6) toward the object side and the positive meniscus lens (L5), convex to the object side, makes it possible to provide such a relatively wide air space ($d_{10}$).

Figure 12A:
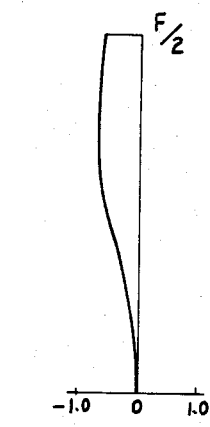
FIGS. 12a, 12b, 12c and 12d are reference graphical plots of the aberrations in relation to the fifth embodiment.
Figure 12B:
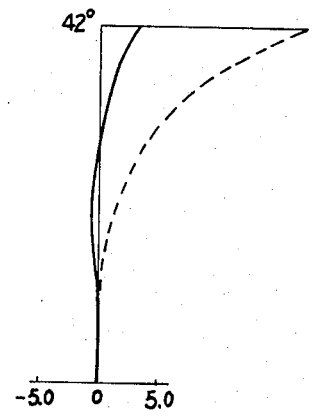
Figure 12C:
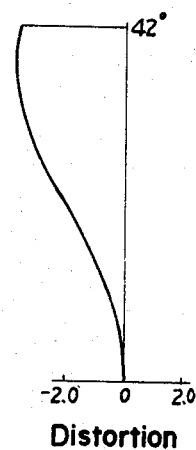
Figure 12D:
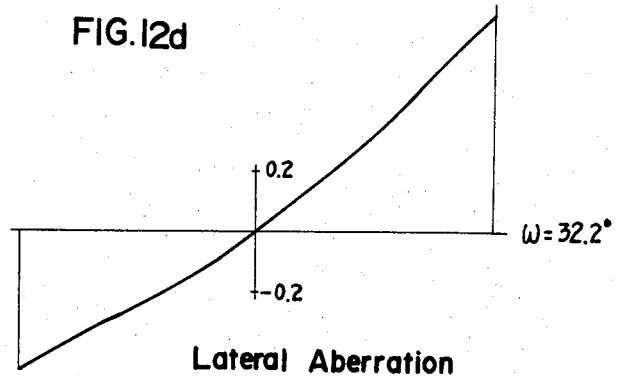
Figure 13A:
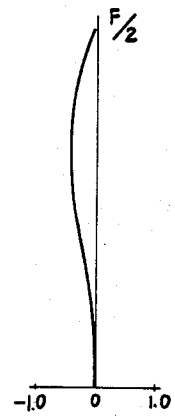
FIGS. 13a, 13b, 13c and 13d.
Figure 13B:
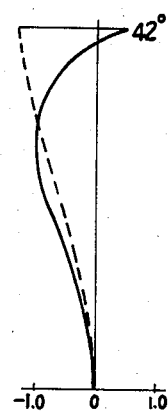
Figure 13C:
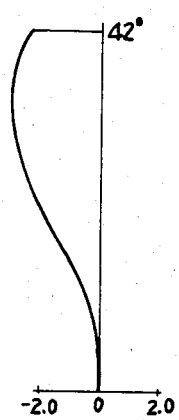
Figure 13D:
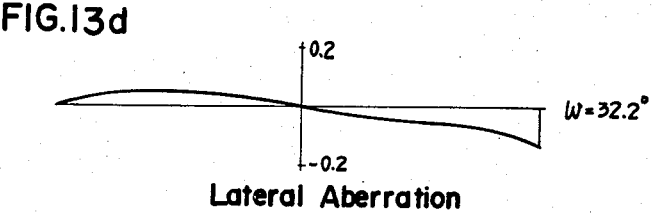
Figure 14A:
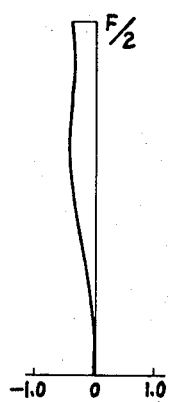
FIGS. 14a, 14b, 14c and 14d are graphical plots of the aberrations of the fifth embodiment.
Figure 14B:
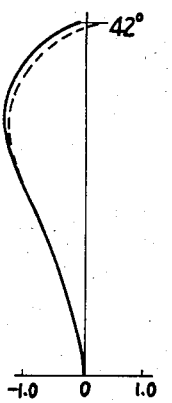
Figure 14C:
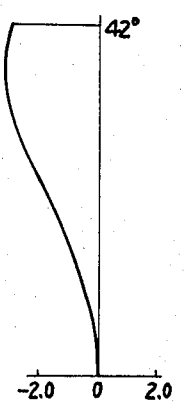
Figure 14D:
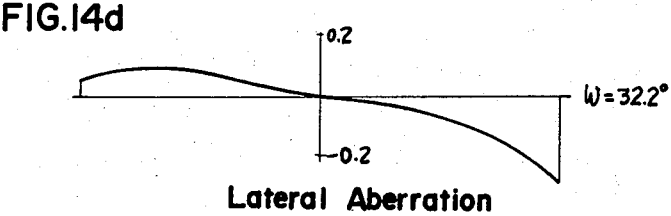

FIGS. 11a, 11b, 11c and 11d show graphic plots of aberrations obtained by focusing the lens system of Talbe 5 to a condition of magnification, $\beta = 0.157$. As apparent from FIGS. 11a to 11d and 12a to 12d in comparison with FIGS. 10a to 10d, spherical aberration deviates towards the negative side, and astigmatism towards the positive side, if the system of Table 5 is focussed to a closer object without the relative movement of biconvex lens element (L6). Further, astigmatic difference is increased in this case, as seen from FIGS. 11b and 12b.

In contrast to the above case, FIGS. 13a to 13d and 14a to 14d are graphic plots of aberrations of the fifth embodiment in which biconvex lens element (L6) is relatively moved in association with the focusing, FIGS. 13a to 13d correspond to the case of magnification, $\beta = 0.025X$, and FIGS. 14a to 14d to the case of magnification, $\beta = 0.157X$. As seen from the Figures, spherical aberration, astigmatism, distortion and coma are almost identical with those in FIGS. 10a to 10d. Especially, the remarkable correction of coma in close focusing such as in magnification, $\beta = 0.157X$ shown in FIG. 14d has not been expected in the prior art.

As can be readily appreciated, it is possible to deviate from the above embodiments of the present invention and, as will be readily understood by those skilled in the optical art, the invention is capable of many modifications and improvements within the scope and spirit thereof. Accordingly, it will be understood that the invention is not to be limited by the specific enclosed embodiments but only by the scope and spirit of the appended claims.

What is claimed is:

1. An inverted telephoto type wide angle lens system comprising:
    an aperture stop;
    a first group of lens elements defined between a front surface of the system and a surface adjacent to the aperture stop at the object side thereof; and
    a second group of lens elements defined between a surface adjacent to the aperture stop at the image side thereof and a rear surface of the system, the second group including a biconvex lens element, at least one lens element located between the aperture stop and the biconvex lens element, and at least one lens element located at the image side of the biconvex lens element, wherein the biconvex lens element is axially movable relative to the other lens elements in association with the focusing, and the lens system fulfills the following conditions:

$0.15f < X < 0.4f$ $0.6f < f_b < 2.0f$ wherein:
    X represents the maximum axial distance from the aperture stop to the object side surface of the biconvex lens element;
    $f_b$ represents a focal length of the biconvex lens element, and f represents a focal length of the whole lens system.

2. The invention of claim 1, wherein at least one lens element located between the aperture step and the biconvex lens element consists of a positive meniscus lens element convex to the object side.

3. An inverted telephoto type wide angle lens system consisting, from the object to the image side, of:
    a first component of a positive meniscus lens element convex to the object side;

a second component of a negative meniscus lens element convex to the object side;

a third component of a negative meniscus lens element convex to the object side;

a fourth component of a biconvex lens element;

an aperture stop;

a fifth component of a positive meniscus lens element convex to the object side;

a sixth component of a biconvex lens element;

a seventh component of a biconcave lens element;

an eighth component of a positive meniscus lens element convex to the image side;

and a ninth component of overall positive refractive power including at least one lens element.

4. The invention of claim 5, wherein the positive meniscus lens element of the eighth component is a doublet.

5. The invention of claim 3, wherein the ninth component consists of a pair of lens elements.

6. The invention of claim 5, wherein one of the pair of lens elements of the ninth component is a doublet.

7. The invention of claim 3, wherein the lens system fulfills the following conditions:

$$1.5f < |f_F| < 3.0f, f_F < 0$$

$$3f < f_m < 12f$$

$$f < r_m < 5f$$

$$0.06f < d < 0.2f$$

wherein:

$f_F$ represents an overall focal length of the first to fourth component;

$f_m$ represents a focal length of the positive miniscus lens element of the fifth component;

$r_m$ represents a radius of curvature of an object side surface of the positive meniscus lens element of the fifth component;

d represents an axial distance between the fifth and sixth components; and f represents a focal length of the whole lens system.

8. The invention of claim 3, wherein the biconvex lens element of the sixth component is axially movable relative to the other lens elements in association with the focusing, and the lens system fulfills the following conditions:

$$0.15f < X < 0.4f$$

$$0.6f < f_b < 2.0f$$

wherein:

X represents the maximum axial distance from the aperture stop to the object side surface of the biconvex lens element of the sixth component;

$f_b$ represents a focal length of the biconvex lens element of the sixth component; and f represents a focal length of the whole lens system.

9. The invention of claim 8, wherein the lens system further fulfills the following conditions:

$$1.5f < |f_F| < 3.0f, f_F < 0$$

$$3f < f_m < 12f$$

$$f < r_m < 5f$$

$$0.06f < d < 0.2f$$

wherein:

$f_F$ represents an overall focal length of the first to fourth components;

$f_m$ represents a focal length of the positive meniscus lens element of the fifth component;

$r_m$ represents a radius of curvature of an object side surface of the positive meniscus lens element of the fifth component; and d represents an axial distance between the fifth and sixth components.

10. The invention of claim 3, wherein the lens system fulfills the following conditions:

$$f < r_m < 5f$$

$$0.06f < d < 0.2f$$

wherein $r_m$ represents a radius of curvature of an object side surface of the positive meniscus lens element of the fifth component; d represents an axial distance between the fifth and sixth components; and f represents a focal length of the whole lens system.

11. The invention of claim 10, wherein the lens system further fulfills the following condition:

$$1.5f < |f_F| < 3.0f, f_F < 0$$

wherein $f_F$ represents an overall focal length of the first to fourth components.

12. The invention of claim 11, wherein the ninth component consists of a pair of lens elements.

13. The invention of claim 12, wherein one of the pair of lens elements of the ninth component is a doublet.

14. The invention of claim 13, wherein the biconvex lens element of the sixth component is axially movable relative to the other lens elements in association with the focusing, and the lens system fulfills the following conditions:

$$0.15f < X < 0.4f$$

$$0.6f < f_b < 2.0f$$

wherein X represents the maximum axial distance from the aperture stop to the object side surface of the biconvex lens element of the sixth component; and $f_b$ represents a focal length of the biconvex lens element of the sixth component.

15. An inverted telephoto type wide angle lens system comprising:

an aperture stop;

a first group of lens elements defined between a front surface of the lens system and a surface adjacent to the aperture stop at the object side thereof, and a second group of lens elements defined between a surface adjacent to the aperture stop at the image side thereof and a rear surface of the system, the second group including, next to the aperture stop, a positive meniscus lens element convex to the object side, a biconvex lens element next to the positive meniscus lens element at the image side thereof, the biconvex lens element being axially movable relative to the other lens elements in association with the focusing, wherein the lens system fulfulls the following conditions:

$f < r_m < 5f$ $0.06f < d < 0.02f$ $0.15f < X < 0.4f$ $0.6f < f_b < 2.0f$ wherein $r_m$ represents a radius of curvature of an object side surface of the positive meniscus lens element; d represents an axial width of an air space next to the positive meniscus lens element at the image side thereof; X represents the maximum axial distance from the aperture stop to the object side surface of the biconvex lens element, $f_b$ represents a focal length of the biconvex lens element, and f represents a focal length of the whole lens system.

16. The invention of claim 15, wherein the lens system further fulfills the following condition:

$1.5f < |f_F| < 3.0f, f_F < 0$ wherein $f_F$ represents an overall focal length of the first group.

17. The invention of claim 3, wherein the air space between the fifth and sixth components is changeable in association with the focusing.

18. The invention of claim 17, wherein the sixth component is axially movable relative to the other components for changing the air space between the fifth and sixth components in association with the focusing.

19. The invention of claim 17, wherein the lens system fulfills the following condition:

$0.15f < X < 0.4f$ wherein X represents the maximum axial distance from the aperture stop to the object side surface of the sixth component.

20. An inverted telephoto type wide angle lens system comprising:
an aperture stop;
a first group of lens elements, immovable relative to each other and defined between a front surface of the system and a surface adjacent to the aperture stop at the object side thereof, consisting, consecutively from the object to the image side, of a first negative sub-group including at least two negative meniscus lens elements each convex to the object side and a second sub-group including a positive lens element; and
a second group of lens elements defined between a surface adjacent to the aperture stop at the image side thereof and a rear surface of the system, the second group including next to the aperture stop a positive meniscus lens element convex to the object side, the location of the positive meniscus lens element being unchangeable relative to the aperture stop upon focusing, and a plurality of lens elements succeeding the positive meniscus lens element at the image side thereof, the plurality of lens elements being of a positive refractive power on the whole and including a negative lens element and at least two positive lens elements at the image side of the negative lens element, wherein the air space between the positive meniscus lens element and the most object side lens element of the plurality of lens elements is changeable in association with a focusing mode of operation.

21. The invention of claim 20, wherein the most object side lens element of the plurality of succeeding lens elements is axially movable relative to the other lens elements for changing the air space between the positive meniscus lens element and the most object side lens element of the plurality of succeeding lens elements.

22. The invention of claim 20, wherein the lens system fulfills the following condition:

$0.15f < X < 0.4f$ wherein f repesents a focal length of the whole lens system and X represents the maximum axial distance from the aperture stop to the object side surface of the most object side lens element of the plurality of succeeding lens elements.

23. The invention of claim 24, wherein the lens system fulfills the following conditions:

$f < r_m < 5f$ $0.06f < d < 0.2f$ wherein f represents a focal length of the whole lens system and $r_m$ represents a radius of curvature of an object side surface of the positive meniscus lens element and d represents an axial width of the air space between the positive meniscus lens element and the most object side lens element of the plurality of succeeding lens elements.

24. An inverted telephoto type wide angle lens system comprising:
an aperture stop;
a first group of lens elements defined between a front surface of the system and a surface adjacent to the aperture stop at the object side thereof, consisting, consecutively from the object to the image side, of a positive lens element, a first negative lens element a second negative lens element and a positive lens element, and a second group of lens elements defined between a surface adjacent to the aperture stop at the image side thereof and a rear surface of the system, the second group including, consecutively, next to the aperture stop a positive meniscus lens element convex to the object side, a first positive lens element, a negative lens element, a second positive lens element and a group of lenses of an overall positive refractive power consisting of at least one lens element wherein the lens system fulfills the following conditions:

$1.5f < |f_F| < 3.0f, f_F < 0$ $3f < f_m < 12f$ $f < r_m < 5f$ $0.06f < d < 0.2f$ wherein
$f_F$ represents an overall focal length of the first group;
$f_m$ represents a focal length of the positive meniscus lens element;
$r_m$ represents a radius of curvature of an object side surface of the positive meniscus lens element;

d represents an axial width of an air space next to the positive meniscus lens element at the image side thereof, and f represents a focal length of the whole lens system.

25. An inverted telephoto type wide angle lens system comprising:

an aperture stop;

a first group of lens elements defined between a front surface of the system and a surface adjacent to the aperture stop at the object side thereof, and a second group of lens elements defined between a surface adjacent to the aperture stop at the image side thereof and a rear surface of the system, the second group including next to the aperture stop a positive meniscus lens element convex to the object side, and a biconvex lens element next to the positive meniscus lens element at the image side thereof, the biconvex lens element being axially movable relative to the other lens elements in association with the focusing, wherein the lens system fulfills the following conditions:

$$1.5f < f_F < 3.0f, f_F < 0$$

$$3f < f_m < 12f$$

$$f < r_m < 5f$$

$$0.06f < d < 0.2f$$

$$0.15f < X < 0.4f$$

$$0.6f < f_b < 2.0f$$

wherein $f_F$ represents an overall focal length of the first group;

$f_m$ represents a focal length of the positive meniscus lens element;

$r_m$ represents a radius of curvature of an object side surface of the positive meniscus lens element;

d represents an axial width of an air space next to the positive meniscus lens element at the image side thereof;

X represents the maximum axial distance from the aperture stop to the object side surface of the biconvex lens element;

$f_b$ represents a focal length of the biconvex lens element, and f represents a focal length of the whole lens system.

* * * * *